Patented Feb. 16, 1937

2,071,253

UNITED STATES PATENT OFFICE 2,071,253

LINEAR CONDENSATION POLYMERS

Wallace H. Carothers, Wilmington, Del., assignor to E. I. du Pont de Nemours & Company, Wilmington, Del., a corporation of Delaware No Drawing. Application January 2, 1935, Serial No. 180

20 Claims. (Cl. 260—112)

This invention relates to compositions of matter, and more particularly to new polyamides.

This case is a continuation in part of my application Serial No. 548,701 filed July 3, 1931.

In the mentioned application I have described fiber-forming polymers among which are synthetic linear condensation polyamides formed by reacting organic diamines with dibasic acids or with the amide-forming derivatives of dibasic acids, and polyamides formed from polymerizable amino acids. The claims in this application are directed generally to polyamides capable of being formed into useful fibers and specifically to such polyamides comprising polymerized amino acids, the fiber-forming polyamides derived from diamines and dibasic acids being specifically claimed in my application Serial Number 74,811, filed April 16, 1936.

With regard to the amino acid polymers, it is well known that certain amino acids and derivatives of amino acids can be caused to react with themselves with the formation of polyamides. Thus, according to Curtius and Benrath (Ber. 37, 1279 (1904)) the simplest of the amino acids, glycine, loses water at high temperature furnishing a product consisting largely of tetraglycyl glycine:

$$5NH_2CH_2COOH \rightarrow NH_2CH_2CO(NHCH_2CO)_3NHCH_2COOH + 4H_2O$$

It is known further that 6-aminocaproic acid polymerizes at high temperature yielding chiefly a linear polyamide whose structure can in part be represented by the general formula $$\ldots -NH(CH_2)_5CO-NH(CH_2)_5CO-NH(CH_2)_5CO-\ldots$$

(See Gabriel and Maas, Ber. 32, 1266 (1899); v. Braun, Ber. 40, 1840 (1907); Carothers and Berchet, J. Am. Chem. Soc. 52, 5289 (1930). The ethyl ester of 6-aminocaproic acid also polymerizes at elevated temperature with the loss of ethyl alcohol yielding a polymer of the same general type. In a similar manner 7-aminoheptoic acid $NH_2(CH_2)_6COOH$ is largely converted to a polyamide when it is caused to react with itself by heating to an elevated temperature. (Manasse, Ber. 35, 1367 (1902); v. Braun, Ber. 40, 1840 (1907)). However, polyamides having unit lengths greater than 8 do not appear to have been described and no polyamides have been described that have the remarkable properties of those of the present invention.

This invention has as an object the preparation of new and useful products of high molecular weight. A further object is to prepare new polyamides from amino acids. A further object is to prepare from amino acids polyamides which can be drawn into fibers. A still further object is to prepare strong, pliable, highly oriented fibers.

These objects are accomplished by the following invention which comprises polymerizing an amino acid or a derivative of the amino acid and continuing the polymerization by heat treatment until the product formed is capable of being drawn into a continuous filament.

The polyamides with which the present invention is concerned are derived from amino acids. These polyamides may be represented in part by the general formula $$\ldots -N(R)-R'-CO-N(R)-R'-CO-N(R)-R'-CO-\ldots$$

in which the number of atoms in the chain of the recurring unit $-N(R)-R'-CO-$ derived from the amino acid is referred to herein as the unit length.

Amino acids of the formula $$R-NH-R'-COOH$$

generally present the formal possibility of polymerizing or condensing with themselves by the elimination of water, e. g., $$2NH(R)R'COOH \rightarrow NH(R)R'CO-N(R)R'CO-OH+H_2O$$
$$NH(R)R'COOH+NH(R)R'CO-N(R)R'CO-OH \rightarrow$$
$$NH(R)R'CO-N(R)R'CO-N(R)R'CO-OH+H_2O, \text{etc.}$$

In the above formulae R' is a divalent organic radical and R is a univalent organic radical or hydrogen. The condensation products just illustrated may be referred to as linear polyamides. Their molecules are chains built up from the radicals or units $-N(R)R'CO-$ which may be called the structural units of the polymers. These units are formally derived from the amino acids by the elimination of water. The number of atoms in the chain of this unit may be called the unit length. The following examples will illustrate the meaning of this term:

| Formula of acid | Structural unit | Unit length |
|---|---|---|
| $NH_2CH_2COOH$ | $NHCH_2CO$ | 3 |
| $CH_3NHCH_2COOH$ | $N(CH_3)CH_2CO$ | 3 |
| $NH_2(CH_2)_6COOH$ | $NH(CH_2)_6CO$ | 7 |
| $NH(CH_3)(CH_2)_6COOH$ | $N(CH_3)(CH_2)_6CO$ | 8 |

The present invention rests on the discovery that it is possible by a sufficiently continued polymerizing heat treatment to convert polyamides of the types referred to above into polyamides of higher molecular weight which are then capable of being drawn into continuous filaments.

My process comprises as a first step the conversion in any convenient manner of the amino acid or a suitable derivative of the amino acid into a polyamide having an average molecular weight not less than twice that of the amino acid, and as a second step the conversion of the non-fiber-forming polyamide into the fiber-forming high molecular weight polyamide. Thus, in the above mentioned first step the acid may be heated at atmospheric pressure and at a temperature of 75 to 275° C. but preferably above 150° C. until more than 0.5 mole of water is formed for each mole of acid used, or an alkyl or aryl ester of the acid may be heated similarly until at least 0.5 mole of alcohol or phenol is formed for each molecule of alcohol used. A typical product obtained in accordance with the first step has a molecular weight in the neighborhood of 800–1200.

The temperature used in the final polymerization of the second step should be above 150° C. and preferably in the range of 180 to 275° C. The reaction is preferably carried out under pressures which permit the ready distillation of the liberated water, alcohol, or phenol. Reduced pressures are preferred although atmospheric pressure may be used. The temperature indicated will vary somewhat with the nature of the amino acid from which the polyamide is derived. In the absence of a solvent or medium, the final stage of the reaction must be carried out at a temperature above the melting point of the polyamide. The time and pressure required in the final stage to produce a polymer suitable for spinning will depend in part on the size of the batch and in part on the amount of surface it presents. The final stage of the reaction may be hastened by stirring the reaction mixture or by bubbling through it or passing over it an inert gas such as nitrogen. A factor that must be kept in mind, however, is that the final reaction mass conducts heat very slowly and if local cooling takes place in the interior of the mass, solid particles or lumps will tend to separate causing incomplete reaction. For this reason, if a gas is passed through the reaction mixture it should preferably be preheated.

In accordance with the preferred practice of the present invention the polymerization of amino acids having a unit length of at least 7 is carried out in the manner described above which results in a high molecular product having properties quite different from the polyamides heretofore prepared. In order that the polyamide have a unit length greater than 6 the amino acid (which for the present purpose means also the appropriate derivative) from which the polyamide is made should be one in which there are at least 5 atoms in the chain separating the carboxyl group and the amino or substituted amino group. An example of an amino acid having the minimum limitation just mentioned is 6-aminocaproic acid, $$NH_2(CH_2)_5COOH,$$

which yields by the methods described hereinafter a polyamide, 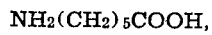, having a unit length of 7. The subscript $x$ in this and in similar formulae given in this specification represents a large indefinite integral number. My new superpolymers made in accordance with the preferred method just mentioned yield on acid hydrolysis amino acids in which the amino and carboxyl groups are separated by a chain of at least 5 atoms.

The essential feature of the present invention is the further polymerization, under suitable conditions, of low molecular weight fusible or soluble polyamides which have more than two structural units and are derived from monoaminomonocarboxylic acids, the polymerization being continued until a product capable of being drawn into continuous filaments is formed.

While my invention is most easily operated with low molecular weight polyamides derived from amino acids having unit lengths of at least seven, it is also applicable to certain polypeptides or to the amino acids from which they are derived (unit length=3). However, I have not succeeded in preparing useful products from amino acids having unit lengths of 5 and 6 because these acids do not appear to be polymerizable under ordinary conditions.

As mentioned above, the polyamide resulting from the reaction in the first stage is converted into a superpolymer by further heating preferably in the molten condition and preferably under a good vacuum (below 20 mm.). The heating is continued until the polymerization reaction has proceeded far enough to give a readily spinnable product. The time of heating required varies with different amino acids and amino acid esters. If the heating period is continued too far beyond the optimum, which must be determined by experiment for each compound, inferior products are obtained. A molecular still may be used in the preparation of the superpolyamides but generally conventional distillation apparatus is satisfactory. The superpolyamides can often be prepared by heating the polyamide at atmospheric pressure.

As described in the above mentioned application, the polyamides derived from diamines and dibasic acids, as for instance from ethylene diamine and ethyl sebacate, are obtained under similar reaction conditions with removal of the volatile reaction products until the resulting polyamide is capable of being drawn into continuous filaments which may be further drawn into orientated fibres.

The most obvious distinction between the low polymers and the high polymers is that the former when molten are relatively much less viscous. The high polymers even at temperatures above 200° C. are scarcely capable of flowing. These polymers also dissolve more slowly than the low polymers and solution is preceded by swelling. As already mentioned, the high polymers can be spun into continuous highly oriented filaments whereas the low polymers cannot. In general the low polymers can be converted into high polymers by a continuation of the reaction by which the low polymers were formed or, for example, by further heating at higher temperature under conditions that permit the rapid removal of any readily volatile products. The necessary conditions vary according to the particular case as is indicated in the discussion of various factors presented above, but in practice the conversion to high polymer is easily tested for merely by touching the surface of the molten polymer with a rod and drawing the rod away. If high polymer is present a continuous filament of considerable strength and pliability is readily formed. This simple test is easily used to control the completion of the reaction. The length of the heat treatment necessary to obtain products of optimum utility for spinning must be determined for each polymer. If the heat treatment is continued after this optimum has been reached, inferior products are obtained.

The high molecular weight polyamides of this invention are all capable of being spun into continuous filaments. The spinning may be carried out in a number of ways. That is, the polyamide may be dissolved in a suitable solvent and the solution extruded through orifices into a coagulating bath, the resulting filament being continuously collected on a suitably revolving drum or spindle. Or, the extruded solution may be passed through a heated chamber where the solvent is removed by evaporation. The properties of the polyamides of this invention also make it possible to spin the molten material directly without the addition of any solvent or plasticizer. For this purpose a mass of the molten polymer may be touched with a rod. Upon drawing the rod away a filament is formed. The filament may be caught on a moving drum or reel and in this manner a continuous filament may be drawn from the molten mass until the latter is exhausted. The cross-section of the filaments thus obtained can be regulated by controlling the temperature of the molten mass and the rate of reeling. The higher the temperature and the more rapid the rate of reeling, the finer will be the filament.

Continuous filaments may also be produced by extruding the molten polyamide through an orifice and continuously collecting the extruded filament on a rotating drum. The fineness of the filaments may be controlled by controlling the temperature of the molten polymer, the amount of pressure applied, the size of the orifice, and the rate of reeling. The properties of the polyamides of this invention make it possible to obtain exceedingly fine filaments, as fine as 0.2 denier or less.

A remarkable characteristic of filaments of the polyamides of this invention is their ability to accept a very high degree of permanent orientation under stress. Filaments obtained by spinning the polyamides under such conditions that very little stress is applied very closely resemble the polymer from which they are drawn. In particular, when examined by X-rays they furnish X-ray powder diffraction patterns, but by the application of moderate stress at ordinary temperature these filaments can be instantly elongated or cold-drawn as much as 200–700%. This cold drawing is accompanied by a progressive increase in tensile strength until a definite limit is reached beyond which the application of additional stress causes the fiber to break. The cold drawn fibers remain permanently extended, they are much stronger than the material from which they are drawn, more pliable and elastic, and when examined by X-rays they furnish a sharp fiber diffraction pattern. They also exhibit strong birefringence and parallel extinction when observed under crossed Nicols' prisms. This evidence of fiber orientation shows that the cold drawn filaments are true fibers.

In practice, the formation of continuous oriented fibers from the filaments of this invention is easily conducted as an integral part of the spinning operation. Thus the extruded filaments as they are collected may be transferred continuously to a second drum driven at a higher rate of speed, so as to provide any desired degree of stretching or cold drawing. Or friction devices may be inserted between the two drums to provide the necessary stretch. It may be observed that this process of cold drawing differs from the stretch-spinning known to the artificial fiber art in that it may be carried out very rapidly and completely in the total absence of any solvent or plasticizer.

The following examples are further illustrative of the methods used in carrying out my invention:

*Example I*

Polyamide, [—(CH$_2$)$_8$CONH—]$_x$; unit length, 10.

In making the polyamide, five and one-half grams of ethyl-9-aminononanoate,

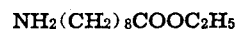

$$NH_2(CH_2)_8COOC_2H_5$$

was heated under atmospheric pressure at 205–210° C. during four hours. The alcohol which distilled off (B. P. 75–80° C.) weighed 1.0 g. as compared with a theoretical value of 1.1 g. for complete reaction. The product which remained as a residue in the reaction vessel was a polyaminononanoylnonanoic ester. When cold it was a hard, rather tough, opaque horny solid which melted to a very viscous liquid at about 195° C. The material did not string out into filaments when it was touched with a rod and the rod withdrawn. This viscous polymer was then heated at 220–240° C. under 1 mm. pressure during eight hours. The heating was accompanied by a progressive increase in viscosity.

The superpolymer (4 g.) obtained in accordance with the foregoing example was grey, hard, and horn-like. It melted to a transparent mass that was barely capable of flowing at 195–198° C. without decomposition and had a density of 1.067. It was insoluble in common solvents under ordinary conditions. Boiling formamide partially dissolved the polymer, and it was completely soluble in boiling phenol. Liquid ammonia at —80° C. had no effect. The polymer could be readily drawn into strong, pliable filaments as is illustrated below.

Short filaments are produced by touching the molten polymer with a stirring rod, and drawing the rod away. Continuous uniform filaments having a diameter of 0.007 mm. or less were easily prepared as follows: The molten polymer was extruded from a spinneret having an orifice made from a number 20 hypodermic needle (diameter of bore 0.47 mm.) and maintained at 208–210° C. by means of an enveloping copper block electrically heated. The gauge pressure required to extrude the polymer from a number 20 needle at 210° C. was 8–10 pounds. A smaller needle required a greater pressure for the extrusion; for example, 30–35 pounds pressure was used with a number 23 (diameter of bore 0.31 mm.). The extruded filament was reeled up on a motor driven drum at the rate of 70 ft./min. and simultaneously wound up (cold drawn) on a second drum at the rate of 270 ft./min. corresponding to 286 per cent elongation. Spinning at even higher degrees of stretch are possible, the maximum lying in the neighborhood of 500%. The cold drawn filaments are strong, tough, pliable, lustrous, and permanently oriented.

Measured strengths of filaments spun from the polyamide ((CH$_2$)$_8$CONH—)$_x$ vary over a considerable range, since they depend upon the fineness of the filament, the degree of stretch used in spinning, and various other factors. In general, however, the strengths are considerably higher than those observed for other forms of artificial silk. Typical values are 2 to 5 g./d. or 20 to 50 kg./mm.² with the denier varying from 3 g. to 1.2 g. for filaments stored at 25° C., 50% relative humidity. It may be added that the strength of the polyamide fibres is unusually insensitive to conditions of temperature or humidity. These values compare very favorably with those for cotton (28 kg./mm.² or 2 g./d.) and silk (35 kg./mm.² or 4 g./d.).

The polyamide fibers also show exceptionally good elastic behavior. In this respect they are much superior to existing artificial silks. The elastic behavior depends to a certain extent on the amount of stretch or cold drawing used in the spinning operation; the more complete the cold drawing, the more perfect is the elastic behavior. Typical data on elastic recovery of fibers from the polyamide [(CH₂)₈CONH]ₓ are shown below.

| Percent of cold drawing in spinning | Stretch | Duration of stretch | Elastic recovery * |
|---|---|---|---|
| Percent | Percent | Seconds | Percent |
| 286 | 8.0 | 180 | 78 |
| 302 | 9.8 | 100 | 88 |
| 502 | 9.7 | 100 | 93 |

\* This recovery is almost instantaneous.

Exposure tests carried out on samples of these polyamide fibers (cold drawn 286%) show their resistance to moisture and organic solvent to be excellent. Specimens immersed in toluene and in 2% aqueous sodium oleate at ordinary temperature during two months were as strong as the original fibers. Similar results were obtained with specimens stored in toluene at 112° C. and in air at 105° C. during five weeks. A specimen after one month in boiling water was unchanged.

Dyeing experiments with fibers from

showed that the spun polyamide readily and permanently absorbed from a weakly acid medium those dyes ordinarily used for silk and wool.

X-ray photographs of the polyamide made as described in the foregoing example were made of the polymer in its massive state (solid polymer before spinning) and in the form of cold drawn filaments. The massive polymer gave a powder X-ray diffraction pattern, indicating that it has a crystalline structure. The filaments gave a sharp fiber diffraction pattern which clearly shows that the cold drawn filaments are true fibers and show orientation along the fiber axis. The fiber structure is developed during the process of cold drawing. The fibers also exhibit strong birefringence and parallel extinction when observed under crossed Nicols' prisms.

The fibers made in accordance with the present invention are practically insensitive to moisture as shown by the following experiment in which 0.3468 g. of the above mentioned dry fibers (dried by heating for 18 hours at 100° C.) was placed in a room maintained at 25° C. and 50% relative humidity. After five hours exposure the fibers weighed 0.3484 g., indicating a 0.46% increase in weight due to moisture absorption. Viscose rayon under these conditions absorbs about 8% water.

The remarkable wet strength of my new fibers is shown by the following: Fibers of the polyamide made in accordance with the above example which had been cold drawn 150% and had a denier of 5.97 g. were found to have a dry strength of 3.3 g. per denier and a wet strength of 4.2 g. per denier. Most artificial fibers have a much lower wet strength than dry strength; for example, a sample of viscose rayon was found to have a dry strength of 1.05 g. per denier and a wet strength of 0.57 g. per denier while a sample of cellulose acetate rayon gave values of 1.59 g. per denier and 0.76 g. per denier for the dry and wet strengths, respectively.

*Example II*

Polyamide, [(CH₂)₁₀CONH]ₓ; unit length, 12.

By heating 11-aminoundecanoic acid, NH₂(CH₂)₁₀COOH, for one-half hour at 220–225° C. it readily polymerized with the liberation of water. The product which remained as a residue in the reaction vessel was a white, opaque, hard, rather tough mass which melted to a very viscous liquid at about 180° C. It was polyaminoundecanoyl aminoundecanoic acid. When this molten polymer was touched with a rod and the rod withdrawn it did not yield any filaments. In order to obtain a spinnable polymer, this product was heated for 3.5 hours at 220–225° C. at a pressure less than 1 mm. of mercury. The resulting polymer melted at 180° C. and was easily spinnable.

Following the general procedure described in Example I filaments were spun from this polyamide. In a typical experiment the conditions were as follows: diameter of orifice, 0.47 mm.; temperature, 196° C.; pressure, 4 pounds; spinning rate, 70 ft./min.; cold drawing rate, 300 ft./min.; elongation, 330 per cent; denier of filament, 7.6 g. The filaments obtained in this way had a silky appearance. Other properties of the filaments observed were M. P. 174–178° C.; denier at break, 5.0; elongation, 552 per cent; tenacity, 2.7 grams per denier.

*Example III*

Polyamide, [—(CH₂)₁₆CONH—]ₓ; unit length, 18.

The ethyl ester of 17-aminoheptadecanoic acid was converted into a polyamide by heating for three hours at 170–200° C. at atmospheric pressure. The polyamide which remained as a residue in the reaction vessel was an opaque, tough, rather waxy solid which melted to a viscous liquid at about 147° C. It was almost completely devoid of spinning properties. The yield was quantitative. This product was transformed into polyamide having excellent spinning properties by 20 hours additional heating at 225–230° C. under a pressure of less than 1 mm. The resultant product melted at 147–150° C.

*Example IV*

Polyamide [(CH₂)₅CONH]ₓ; unit length, 7.

Approximately 50 g. of 6-aminocaproic acid was heated for 0.5 hour at 220–225° C. at atmospheric pressure. Nearly the theoretical amount of water distilled off during this period. The residue was a hard opaque solid. It was a polyamide of 6-aminocaproic acid mixed with a small proportion of the corresponding monomeric lactam,

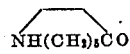

It did not show any spinning properties. This material was heated further at 225–230° C. under a pressure less than 1 mm. of mercury. A small amount of the monomeric lactam was removed in this way and the residue was converted into a spinnable superpolymer. The superpolyamide was a hard, tough, opaque, white mass which melted at 205–210° C. to a transparent mass that was barely capable of flowing. The polymer had excellent spinning properties, yielding strong, pliable, highly oriented fibers. It dissolved readily in hot glacial acetic acid, and the polymer was precipitated as a fluffy filar mass when the solution was poured into water. The polymer also dissolved in cold concentrated sulfuric acid yielding a clear very viscous solution without any evidence of rapid degradation and the polymer was recovered as a fluffy filar mass on pouring the solution into water.

*Example V*

Polyamide, [(CH$_2$)$_5$CONH]$_x$; unit length, 7.

Ethyl 6-aminocaproate (7.2 g.) was heated at 170–180° C. for 4½ hours. Approximately 1.5 g. of ethanol distilled off during this operation. The polymer formed in this manner was not spinnable. It was heated for 18 hours at 220–240° C. under less than 1 mm. pressure. Two grams of the lactam were collected as a distillate during the heating under reduced pressure. The superpolymer finally obtained melted at 200–203° C. and was readily spinnable.

*Example VI*

Polyamide, [(CH$_2$)$_7$CONH]$_x$; unit length, 9.

A sample of 8-aminocaprylic acid was heated at 220–240° C. for 10 hours at atmospheric pressure under conditions that permit the ready distillation of water. The residual polyamide obtained in this manner is a tough, opaque solid which when molten is readily spun into strong, pliable, highly oriented fibers.

The preparation of polyamides is not limited to the use of the amino acids and derivatives cited in the foregoing examples. Amino acids containing a primary amino group, NH$_2$, react most readily but amino acids containing a secondary nitrogen group, e. g., NHCH$_3$, are also operative. The preferred polyamides can be represented by the general formula

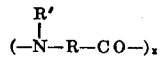

in which R' represents hydrogen or a univalent organic radical, such as alkyl; in which R represents a divalent hydrocarbon or substituted hydrocarbon radical containing at least 5 atoms in the chain; and in which $x$ represents the number of structural units in the polyamide molecule.

Among other amino acids which may be used in the preparation of the polyamides are the following:

NH$_2$(CH$_2$)$_6$COOH, NH$_2$(CH$_2$)$_9$COOH, NH$_2$(CH$_2$)$_{11}$COOH, NH$_2$(CH$_2$)$_n$COOH, CH$_3$CH(NH$_2$)(CH$_2$)$_5$COOH,

NH$_2$CH$_2$CH$_2$CH$_2$CH(CH$_3$)CH$_2$COOH, CH$_3$CH(NH$_2$)CH$_2$C(CH$_3$)$_2$CH$_2$CH$_2$COOH,

NH$_2$CH$_2$CH$_2$CH[C(CH$_3$)=CH$_2$]CH$_2$CH$_2$COOH, CH$_3$NH(CH$_2$)$_5$COOH, 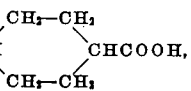

and NH$_2$CH$_2$CH$_2$—⟨ ⟩—COOH.

Derivatives of the acid, such as the ester or acid halide, may be used. It is also possible to use mixtures of the amino acids in the preparation of the polymers. In the preparation of mixed polyamides it is not necessary for the best results that all the amino acids represented have the amino and carboxyl groups separated by a chain of at least 5 atoms. Polyamides of fiber-forming qualities can be obtained by substituting an amino acid, such as NH$_2$(CH$_2$)$_3$COOH, for part of the higher amino acid (higher in the sense that the amino and carboxyl groups are further removed in the chain).

In the preparation of the polyamide the amino acid or ester may be heated to reaction temperature, usually 75–200° C., in a closed vessel or in an open reactor. When an open reactor is used, the rate and extent of the reaction can be determined by measuring the water or alcohol removed. If an ester is to be used in the preparation of the polyamide, it is generally desirable to select an ester of a low boiling alcohol, e. g., methyl, ethyl, and isobutyl alcohols. The phenyl esters may also be used. The reaction may be carried out in the presence of a diluent or solvent. It is also within the scope of this invention to carry out the reaction in the presence of an inert gas, such as nitrogen. Super or sub-atmospheric pressure may be used. Following the initial heating period (either in the open or closed vessel), the polyamide is heated above its melting point, generally 200–275° C. and preferably under a good vacuum (less than 5 mm.) in order to promote further polymerization to a product (superpolymer) of good spinning properties.

A catalyst, e. g., a metal or metal salt, may be used in the preparation of the polyamide but is not necessary. For example, a polyamide similar to that described in Example I can be obtained by heating the ethyl ester of 9-aminononanoic acid with a small amount of sodium. In a specific experiment the polyamide melted at 195–200° C. In general, no added catalysts are required in the above described processes of the present invention. It should be mentioned, however, that the surface of the reaction vessel (e. g., glass) appears to exercise a certain degree of catalytic function in many cases. The use of added catalysts may also confer additional advantages. Examples of such materials are inorganic materials of alkaline reaction such as oxides and carbonates, and acidic materials such as halogen salts of polyvalent metals.

The polyamides of this invention compared with most organic compounds are unusually resistant to oxidation. Nevertheless, at the high temperatures used in their preparation they show a strong tendency to become discolored in the presence of air. For this reason, it is desirable to exclude air or to limit the access of air during their preparation. This may be done by the usual methods, e. g., by operating in a closed vessel during the early stages of the reaction, or, if an open vessel is used, by providing a stream of inert gas. One of the principal advantages of operating under diminished pressure in the later stages of the reaction also is the fact that this greatly cuts down on the incidence of air. It is helpful in some cases to add antioxidants to the reaction mixture, especially antioxidants such as syringic acid that show very little inherent tendency to discolor.

The fiber-forming or superpolyamides are high molecular weight products as are the superpolymers in general disclosed in my mentioned co-pending application, the minimum molecular weights probably being not substantially less than 10,000. The solubility characteristics of the polyamides, however, make accurate molecular weight determinations difficult.

The polyamides of this invention are for the most part relatively high melting solids insoluble in most common organic solvents but generally soluble in hot formamide, phenol, or in acids, such as hydrochloric, sulfuric, or acetic. Generally the melting point decreases and the solubility increases with increase in the unit length of the recurring unit in the polyamide. They are very resistant to hydrolysis especially toward alkaline hydrolytic reagents, and they show little or no tendency toward decomposition until temperatures above 220° C. are reached. On prolonged heating with dilute mineral acids, however, they are hydrolyzed, yielding the monomeric amino acids from which they were derived. The polyamides generally yield sharp X-ray powder diffraction patterns.

The superpolyamides of this invention are especially valuable, because they can be drawn or spun into strong, tough, pliable fibers. By the action of stress these fibers can be permanently stretched, elongated, or "cold drawn" as much as six- or seven-fold. The cold drawn fibers show a greatly increased strength and pliability, and they are highly oriented along the fiber axis as is shown by the fact that they are birefringent, and they furnish a sharp and well developed fiber diffraction pattern when examined by X-rays. The oriented fibers of this invention are in many cases much stronger than any known artificial fibers and are much more resistant toward the action of water, chemical agents, and high temperature.

It will be apparent from the foregoing that the invention described herein affords a method for the preparation of high melting, relatively insoluble products by a simple process. The high softening temperature and the insolubility of the products render them particularly suitable for the preparation of fibers. Fibers prepared from these products are insensitive to moisture and solvents and can be pressed with a hot iron. This synthesis of fiber-forming products is unique in that the products are synthesized from low molecular weight, monomeric, non-fibrous materials. This is quite different from the preparation of fibrous materials, such as cellulose acetate, ethyl cellulose, etc., in which high molecular weight (polymeric) fibrous materials synthesized by nature are used as starting materials. Polyamides may also be used as ingredients in molding, coating, and impregnating compositions.

As many apparently widely different embodiments of this invention may be made without departing from the spirit and scope thereof, it is to be understood that I do not limit myself to the specific embodiments thereof except as defined in the appended claims.

I claim:

1. A process which comprises heating an amide forming compound of the class consisting of polymerizable monoaminomonocarboxylic acids having at least 5 carbon atoms in the chain separating the amino and carboxyl groups and amide forming derivatives thereof until a product is formed which is capable of being drawn into continuous filaments, the nitrogen atom of said amide forming compound carrying at least one hydrogen atom.

2. A step in a process for making polymeric materials which comprises subjecting an amino acid polyamide derived from a polymerizable monoaminomonocarboxylic acid having at least 5 carbon atoms in the chain separating the amino and carboxyl groups and incapable of being drawn into continuous filaments to continued polymerizing heat treatment until the product formed is capable of being drawn into continuous filaments.

3. A process which comprises polymerizing by heat treatment a substance of the class consisting of amino acids and amide forming derivatives thereof, said substance having at least five carbon atoms in the chain separating the carboxyl group and the amino group, said amino group having at least one hydrogen atom on the nitrogen, and continuing the polymerization treatment until the product formed is capable of being drawn into continuous filaments 4. A process which comprises polymerizing by heat treatment a substance of the class consisting of amino acids and amide forming derivatives thereof, said substance having at least five carbon atoms in the chain separating the carboxyl group and the amino group, said amino group having at least one hydrogen atom on the nitrogen, and continuing the polymerization treatment until the product formed is capable of being drawn into continuous filaments which show by characteristic X-ray pattern orientation along the fiber axis.

5. A process which comprises polymerizing by heat treatment a substance of the class consisting of amino acids and amide forming derivatives thereof, said substance having at least five carbon atoms in the chain separating the carboxyl group and the amino group, said amino group having at least one hydrogen atom on the nitrogen, and continuing the polymerization treatment in vacuum until the product formed is capable of being drawn into continuous filaments.

6. A polyamide having recurring structural units of the general formula

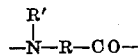

in which R' represents hydrogen or a univalent hydrocarbon radical and R represents a divalent hydrocarbon radical having a chain of at least five carbon atoms, said polyamide being capable of being drawn into continuous filaments.

7. A polyamide having recurring structural units of the general formula

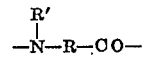

in which R' represents hydrogen or a univalent hydrocarbon radical and R represents a divalent hydrocarbon radical having a chain of at least five carbon atoms, said polyamide being capable of being drawn into continuous filaments which show by characteristic X-ray patterns orientation along the fiber axis.

8. A polyamide having recurring structural units of the general formula

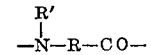

in which R' represents hydrogen or a univalent hydrocarbon radical and R represents a divalent hydrocarbon radical having a chain of at least five carbon atoms, said polyamide being capable of being drawn into continuous birefringent filaments 9. A synthetic polymeric product which yields on acid hydrolysis an amino acid in which the amino and carboxyl groups are separated by a chain containing at least 7 carbon atoms.

10. The process set forth in claim 2 in which said continued heat treatment is at a temperature not less than 150° C.

11. A process which comprises heating a substance of the class consisting of polymerizable monoaminomonocarboxylic acids having at least 5 carbon atoms in the chain separating the amino and carboxyl groups and amide forming derivatives thereof at a temperature of 75° C. to 275° C. and continuing heating the resulting polymer at a temperature above 150° C. until the product formed is capable of being drawn into continuous filaments.

12. A step in a process for making polymeric materials which comprises subjecting an amino acid polyamide derived from a polymerizable monoaminomonocarboxylic acid having at least 5 carbon atoms in the chain separating the amino and carboxyl groups and incapable of being drawn into continuous filaments to continued polymerizing heat treatment at a pressure less than 20 mm. until the product formed is capable of being drawn into continuous filaments.

13. A step in a process for making polymeric materials which comprises subjecting an amino acid polyamide derived from a polymerizable monoaminomonocarboxylic acid having at least 5 carbon atoms in the chain separating the amino and carboxyl groups and incapable of being drawn into continuous filaments to continued polymerizing heat treatment in the presence of an amide forming catalyst until the product formed is capable of being drawn into continuous filaments.

14. A step in a process for making polymeric materials which comprises subjecting an amino acid polyamide derived from a polymerizable monoaminomonocarboxylic acid having at least 5 carbon atoms in the chain separating the amino and carboxyl groups and incapable of being drawn into continuous filaments to continued polymerizing heat treatment in a stream of inert gas until the product formed is capable of being drawn into continuous filaments.

15. A polyamide having recurring structural units of the general formula

—NH—R—CO— in which R represents a divalent hydrocarbon radical having a chain of at least five carbon atoms, said polyamide being capable of being drawn into continuous filaments which show by characteristic X-ray pattern orientation along the fiber axis.

16. A synthetic linear condensation polyamide capable of being formed into fibres showing by characteristic X-ray patterns orientation along the fibre axis.

17. A synthetic polymer capable of being drawn into fibers showing by characteristic X-ray patterns orientation along the fiber axis, said polymer yielding, upon hydrolysis with strong mineral acid, an amino acid containing at least five carbon atoms in the chain separating the carboxyl group and the amino group.

18. A synthetic linear condensation polyamide capable of being formed into fibres showing by characteristic X-ray patterns orientation along the fibre axis, said polyamide being polymerized 6-aminocaproic acid.

19. A synthetic linear condensation polyamide capable of being formed into fibres showing by characteristic X-ray patterns orientation along the fibre axis, said polyamide being polymerized 9-aminononanoic acid.

20. A synthetic linear condensation polyamide capable of being formed into fibres showing by characteristic X-ray patterns orientation along the fibre axis, said polyamide being polymerized 11-aminoundecanoic acid.

WALLACE H. CAROTHERS.